(12) United States Patent
Davin

(10) Patent No.: US 9,514,852 B2
(45) Date of Patent: Dec. 6, 2016

(54) METHOD TO REDUCE THE VOLUME OF BOILING WATER REACTOR FUEL CHANNELS FOR STORAGE

(75) Inventor: Peter F. Davin, Jefferson Hills, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 868 days.

(21) Appl. No.: 13/612,921

(22) Filed: Sep. 13, 2012

(65) Prior Publication Data

US 2013/0129032 A1 May 23, 2013

Related U.S. Application Data

(60) Provisional application No. 61/561,966, filed on Nov. 21, 2011.

(51) Int. Cl.
*G21C 19/375* (2006.01)
*G21F 9/36* (2006.01)

(52) U.S. Cl.
CPC .............. *G21C 19/375* (2013.01); *G21F 9/36* (2013.01); *Y10T 29/49716* (2015.01)

(58) Field of Classification Search
CPC ....... G21C 19/40; G21C 19/375; G21C 19/32; G21C 19/34; G21C 19/37; G21F 9/36; B21K 21/16; G21Y 2002/203; G21Y 2002/304; G21Y 2002/305
USPC . 376/220, 272, 339, 449; 252/478; 100/215, 218, 98
See application file for complete search history.

(56) References Cited

U.S. PATENT DOCUMENTS

| | | | | |
|---|---|---|---|---|
| 3,070,537 A | * | 12/1962 | Treshow | 376/439 |
| 3,816,247 A | * | 6/1974 | Cayol et al. | 376/445 |
| 4,056,052 A | * | 11/1977 | Weil et al. | 100/39 |
| 4,245,532 A | * | 1/1981 | Astill et al. | 83/390 |
| 4,295,401 A | * | 10/1981 | Mullett | G21C 19/34 |
| | | | | 376/264 |
| 4,507,840 A | | 4/1985 | Steinert et al. | |
| 4,511,499 A | * | 4/1985 | Meuschke et al. | 29/723 |
| 4,543,488 A | * | 9/1985 | Diem | 250/507.1 |
| 4,566,302 A | * | 1/1986 | Suvanto | G21F 9/34 |
| | | | | 241/232 |
| 4,711,758 A | * | 12/1987 | Machado et al. | 376/272 |
| 4,723,359 A | * | 2/1988 | Blissell et al. | 29/723 |
| 4,746,487 A | * | 5/1988 | Wachter | 376/272 |
| 4,781,883 A | * | 11/1988 | Daugherty et al. | 376/272 |

(Continued)

FOREIGN PATENT DOCUMENTS

| | | | | |
|---|---|---|---|---|
| JP | 1990083499 | * | 3/1990 | G21F 5/102 |
| JP | 1998-213691 | * | 11/1998 | G21C 3/30 |

OTHER PUBLICATIONS

Roylance (David Roylance; Pressure Vessels; Department of Materials Science and Engineering Massachusetts Institute of Technology Cambridge, MA 02139 Aug. 23, 2001; p. 1-8).*

(Continued)

*Primary Examiner* — Jack W Keith
*Assistant Examiner* — Lily C Garner
(74) *Attorney, Agent, or Firm* — Richard J. Coldren; Westinghouse Electric Company LLC

(57) ABSTRACT

A method of reducing the volume of a boiling water reactor fuel channel for storage in which the fuel channel is sealed with an outer sleeve that is closed at its upper and lower ends. The sleeve, which is made of a malleable metal is then laterally compacted and sheared into segments suitable for transport and/or storage.

5 Claims, 1 Drawing Sheet

(56) References Cited

U.S. PATENT DOCUMENTS

| | | | |
|---|---|---|---|
| 4,957,692 A * | 9/1990 | Lahr et al. | 376/260 |
| 5,055,236 A | 10/1991 | Krieg | |
| 5,263,411 A * | 11/1993 | Gourdol | 100/98 R |
| 5,479,463 A * | 12/1995 | Roberts | 376/339 |
| 5,614,157 A * | 3/1997 | Hall | A61L 11/00 100/229 A |
| 6,523,466 B1 * | 2/2003 | King et al. | 100/98 R |
| 7,150,576 B1 * | 12/2006 | Kambeyanda | 401/292 |
| 7,255,755 B2 * | 8/2007 | Maziasz et al. | 148/327 |
| 7,404,434 B2 * | 7/2008 | Martin et al. | 165/167 |
| 2003/0024411 A1 | 2/2003 | King et al. | |
| 2009/0185652 A1 * | 7/2009 | Tamaki et al. | 376/272 |
| 2010/0089811 A1 * | 4/2010 | Zelechonok et al. | 210/198.3 |
| 2010/0266088 A1 * | 10/2010 | Ahlfeld et al. | 376/210 |

OTHER PUBLICATIONS

Chotin, F., and Ph Pinson. The Atelier De Compactage Des Coques (ACC) Facility: The R&D Programme. No. IAEA-CSP-6/C. IAEA-SM-357/30, 2001. www.iaea.org/inis/collection/NCLCollectionStore/_Public/32/041/32041341.pdf>.*

International Preliminary Report on Patentability for PCT/US2012/064019 dated Jun. 5, 2014 (Forms PCT/IB/373, PCT/ISA/237).

* cited by examiner

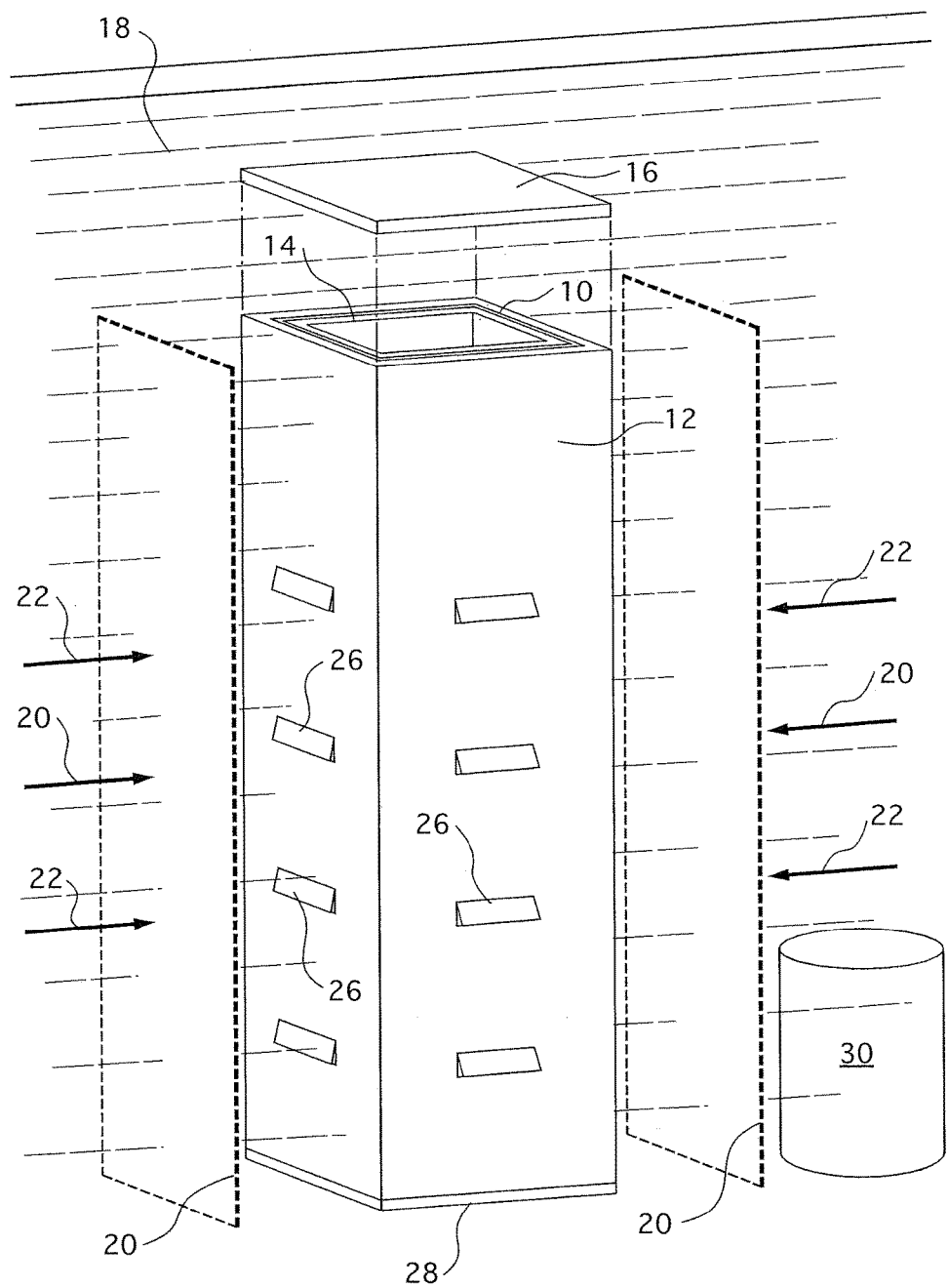

METHOD TO REDUCE THE VOLUME OF BOILING WATER REACTOR FUEL CHANNELS FOR STORAGE

CROSS REFERENCE TO RELATED APPLICATION

This application claims priority under 35 U.S.C. §119(e) from Provisional Application Ser. No. 61/561,966, entitled "Method and Apparatus to Volume Reduce Boiling Water Reactor Fuel Channels for Storage," filed Nov. 21, 2011.

BACKGROUND

1. Field

This invention relates generally to the disposal of highly radioactive components, and, more particularly, to a method for reducing the volume of radioactive rectangular tubular fuel channels for storage.

2. Related Art

One type of commonly used boiling water nuclear reactor employs a nuclear fuel assembly comprised of fuel rods surrounded by a fuel channel. The fuel channel is a 5.3 inch (13.4 cm) square tube having rounded corners, approximately 14 feet long, with open ends. The channels are typically made of zircoloy and have a wall thickness of 0.08, 0.10 or 0.12 inch (0.2, 0.25 or 0.3 cm).

There are a large number of fuel assemblies in a boiling water reactor, and approximately one-third of these assemblies are normally replaced each year. Even though the fuel channels are normally reused after the fuel rods are removed, for various reasons, they need to replaced from time to time, thereby requiring these highly radioactive fuel channels to be disposed of safely.

Following functional service, irradiated fuel channels are difficult to store and dispose of because of their size, configuration, embrittled condition and radiological history. These used fuel channels are highly radioactive for two reasons. First, the zircoloy metal itself becomes radioactive during operation in the nuclear reactor. Secondly, a crust or crud forms on the outside of the fuel channels which is also radioactive. Heretofore, in the United States, the irradiated fuel channels have been stored in spent fuel pools at the nuclear plants in which they experienced service. This type of storage is extremely space inefficient, but dry-cask storage is not readily available. Accordingly, boiling water reactor operators would prefer to dispose of the fuel channels offsite as soon as reasonably practicable.

Fuel channels and other irradiate hardware are typically classified as class C low level radioactive waste, as defined and determined pursuant to 10 CFR 61 and related regulatory guidance. Since Jul. 1, 2008 low level radioactive waste generators within the United States that are located outside of the Atlantic compact (i.e., Connecticut, New Jersey and South Carolina) have not had access to offsite class B or class C low level radioactive waste disposal capacity. A lack of offsite disposal capacity has caused boiling water reactor operators considerable spent fuel pool overcrowding. Though currently very uncertain and subject to numerous regulatory and commercial challenges, class B and C low level radioactive waste disposal capacity for the remainder of the United States low level radioactive waste generators is anticipated in the near future.

In order for the fuel channels to be shipped for offsite storage an economical method of packaging the fuel channels will be required for such offsite storage to be efficient and cost effective. For that to practically occur, the volume of the fuel channels will have to be significantly reduced. One prior art method for the volume reduction of fuel channels that has been employed is the imprecise crushing and shearing of segments of the fuel channel directly above an open disposal liner placed in the bottom of the spent fuel pool into which the crushed and sheared sections fall. Other methods which have been suggested are described in U.S. Pat. Nos. 4,295,401, 4,507,840 and 5,055,236.

For the general purposes of this description, the principal component of a boiling water reactor fuel channel is a metallic generally square, elongated tube the approximate length of a fuel assembly. Following the useful life of a fuel channel, its primary metal constituents are embrittled as a result of prolonged neutron exposure. Segmentation of the fuel channel causes the embrittled metal to shatter thereby exposing the spent fuel pool to unwanted and highly radioactive debris. Furthermore, packaging for disposal requires size reduction of the fuel channels to fit within commercially available, licensed shipping casks and/or to efficiently utilize disposal package space. Lateral segmentation of the fuel channels is generally a prerequisite in order to efficiently utilize the shipping casks, and has historically been technically problematic.

Accordingly, a new method is desired that enables lateral segmentation and compaction of the fuel channel components without historic untoward consequences.

More specifically, such a method is desired that will minimize the creation of any collateral radioactive debris.

Further, such a method is desired that can be efficiently performed cost effectively.

SUMMARY

These and other objects are achieved by the method claimed hereafter for reducing the volume of an elongated boiling water reactor fuel assembly fuel channel for storage. The method includes the step of enclosing the fuel channel within an outer sleeve. The method then laterally compacts the fuel channel within the outer sleeve. Desirably, the step of enclosing the fuel channel in the outer sleeve includes the step of closing a top and bottom of the sleeve prior to the step of laterally compacting the fuel channel. In one embodiment, the step of closing the top and bottom of the sleeve includes the steps of inserting an inner sleeve within the fuel channel with the inner sleeve extending over the elongated dimension of the fuel channel and attaching the top of the outer sleeve to a top of the inner sleeve and the bottom of the outer sleeve to a bottom of the inner sleeve around an entire circumference of the fuel channel. Preferably, the outer sleeve is constructed from a malleable metal such as aluminum or copper.

In still another embodiment, the sleeve is perforated to allow water to escape and, preferably, the perforations have traps to prevent debris from escaping with the water. Desirably, the laterally compacting step is performed with a full length compactor that extends a compacting surface of the compactor over the entire elongated dimension of the fuel channel.

The method may further include the step of laterally segmenting the fuel channel in the outer sleeve into segmented pieces of a desired length, after the laterally compacting step. Preferably, the segmenting step includes the step of shearing the outer sleeve and the fuel channel. The method may then further include the step of packaging the segmented pieces for storage.

BRIEF DESCRIPTION OF THE DRAWINGS

A further understanding of the invention claimed hereafter can be gained from the following description of the preferred embodiments when read in conjunction with the accompanying drawing in which:

FIG. 1 is a simplified schematic of a boiling water reactor fuel channel enclosed within a container formed from an inner and outer sleeve and placed within the walls of a full length compactor that is situated in a spent fuel pool.

DESCRIPTION OF THE PREFERRED EMBODIMENT

In accordance with one embodiment of the invention claimed hereafter and as shown in FIG. 1, a fuel channel 10 is inserted into an outer sleeve 12 that is sealed on top by a cover 16 and a bottom cover 28. The sleeve 12, bottom cover 28 and top cover 16 completely seal the fuel channel 10 within the interior of the sleeve 12. Alternatively, the sleeve 12 and bottom cover 28 can be constructed as an integral can in which the fuel channel 10 can be loaded and sealed by the cover 16. The sleeve or can completely encompasses the channel's length and is preferably made from a malleable metal such as aluminum, copper or other relatively malleable, inexpensive metal. The sleeve, for example, may be on the order of one-eighth inch (0.32 cm) thick. The can or sleeve can have a prefabricated bottom 28 and a "lid" or "top" 16 that will be installed following insertion of the fuel channel 10. Portions of the sleeve or can 12 (i.e., sidewalls, top and/or bottom) will be perforated and screened or otherwise trapped with a trap such as shown at 26 in FIG. 1, to allow water to escape without permitting debris within the sleeve enclosure from escaping. Once the fuel channel is secured within the sleeve enclosure 12, the enclosure will be subjected to a full length hydraulic compactor 20 which will compact the sleeve enclosure in the lateral direction, i.e., a compacting force applied laterally to opposite sides of the sleeve enclosure, preferably over the entire length of its elongated dimension. The sleeve enclosure will then contain shattered fuel channel material which will be isolated by the sleeve from the spent fuel pool.

Following compaction, the sleeve enclosure containing the fuel channel may be laterally segmented to a desired length by use of hydraulic shears 22. The physical limitations of the storage facility or transport casks and the radiation levels of the incremental sections of the sleeve containing the fuel channel will dictate the optimal location along the length of the fuel channel at which lateral segmentation is desired. The can or sleeve is intended to limit or eliminate fuel channel spring back and capture shattered metal that has been embrittled by neutron exposure. Similarly, the can or sleeve is intended to provide a seal at the lateral shearing locations which will continue to contain the shattered material after the segments are separated. The seal is formed from the shear blades forcing the opposite walls of the sleeve against each other as the blades penetrate the sleeve and fuel channel metal. Once sheared, the canned fuel channel sections may be handled and packaged in a cask 30 in a manner that optimizes physical and radiological efficiency.

In an alternate embodiment an inner sleeve 14 that extends at least the length of the fuel channel 10 may be inserted inside the fuel channel and the top of the inner sleeve 14 may be drawn to the top of the outer sleeve 12 and the bottom of the inner sleeve 14 may be drawn to the bottom of the outer sleeve 12 in place of the top 16 and bottom 28 seals previously noted. Alternatively the tops and bottoms of the inner and outer sleeves 14 and 12 may be welded together to form the debris seal between the sleeves. The liner container enclosing the fuel channel may then be crushed and sheared as previously noted. Regardless of the method used, the entire process is carried out under water in the spent fuel pool 18.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the general concepts disclosed and any and all equivalents thereof.

What is claimed is:

1. A method of reducing the volume of an elongated boiling water reactor fuel assembly fuel channel having a plurality of sides, with each side connected along the elongated dimension to two other sides, for storage, comprising, substantially in the following order, performed under water, the steps of:
   enclosing the fuel channel with the plurality of sides connected, in an outer sleeve that extends over the entire elongated dimension of the fuel channel, and is malleable, wherein a portion of the outer sleeve is perforated to allow the water to escape and the perforations have traps to prevent debris from escaping with the water;
   inserting an inner sleeve within the fuel channel with the inner sleeve extending over the elongated dimension around an inside surface of the fuel channel;
   attaching a top of the outer sleeve to a top of the inner sleeve and a bottom of the outer sleeve to a bottom of the inner sleeve around an entire circumference of the fuel channel; and
   laterally compacting the fuel channel within the outer sleeve over the entire length of the outer sleeve at the same time.

2. The method of claim 1 wherein the outer sleeve is constructed from a material selected from a group of metals comprising aluminum and copper.

3. The method of claim 1 including the step of laterally segmenting the fuel channel in the outer sleeve into segmented pieces of a desired length, after the laterally compacting step.

4. The method of claim 3 including the step of packaging the segmented pieces for storage.

5. The method of claim 3 wherein the step of laterally segmenting the fuel channel includes the step of shearing the outer sleeve and fuel channel.

\* \* \* \* \*